United States Patent [19]

Matsumaru et al.

[11] 4,444,723
[45] Apr. 24, 1984

[54] DENITRATION SYSTEMS

[75] Inventors: Kenichi Matsumaru, Tokyo; Hirobumi Oshima, Tokai; Masaaki Hirayama, Yokohama, all of Japan

[73] Assignees: Tokyo Shibaura Denki Kabushiki Kaisha, Kanagawa; Doryokuro Kakunenryo Kaihatsu Jigyodan, Tokyo, both of Japan

[21] Appl. No.: 367,055

[22] Filed: Apr. 9, 1982

[30] Foreign Application Priority Data

Apr. 16, 1981 [JP] Japan .................... 56-57308

[51] Int. Cl.³ .............................................. G21G 5/00
[52] U.S. Cl. .................................... 422/159; 422/186; 422/187; 422/199; 252/632; 219/10.55 A
[58] Field of Search ................ 422/159, 186, 187, 199; 219/10.55 A, 10.55 R; 252/631, 632

[56] References Cited

U.S. PATENT DOCUMENTS 4,221,680 9/1980 Hardwick et al. .................. 422/159
4,364,859 12/1982 Ohtsuka et al. ..................... 252/643

FOREIGN PATENT DOCUMENTS 55-90424 7/1980 Japan .
55-104926 8/1980 Japan .
55-158133 12/1980 Japan .
56-145105 11/1981 Japan .

Primary Examiner—William F. Smith
Attorney, Agent, or Firm—Stevens, Davis, Miller & Mosher

[57] ABSTRACT

A system for denitrating a starting nitric acid solution by irradiation of microwaves to obtain oxide product of the solution comprises a receiver for receiving the solution, a rectangular oven vessel provided with a bottom plate on which the receiver is put, and a conveying mechanism located below the bottom plate for continuously conveying the receiver on the bottom plate throughout the oven vessel. A microwave generator is operatively connected to the oven vessel for generating microwaves to irradiate the content of the receiver when it passes throughout the oven vessel. The receiver may be rotated and vertically moved when it is subjected to denitration and calcination in the oven vessel.

6 Claims, 9 Drawing Figures

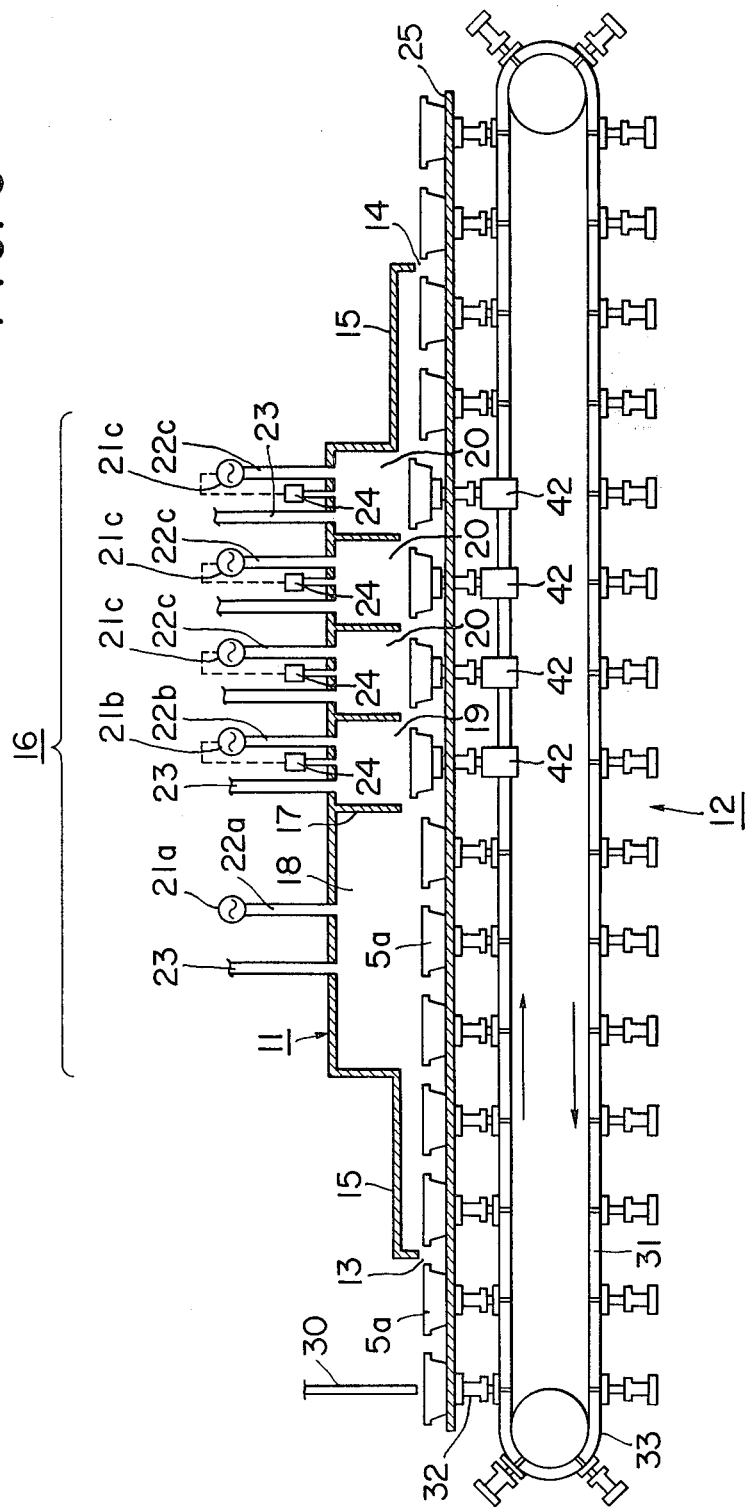

DENITRATION SYSTEMS

BACKGROUND OF THE INVENTION

This invention relates to a system for denitrating nitric acid solution of plutonium nitrate, uranyl nitrate, or mixture thereof and continuously calcinating the denitrated material by irradiating the same with microwaves to produce plutonium oxide, uranium oxide, or mixture thereof to be used as a nuclear fuel.

One typical example of a conventional denitration device is described hereunder in conjunction with FIG. 1. The denitration device of a batch furnace type shown in FIG. 1 generally comprises a heating vessel 1 and a turn table 3 which forms a bottom plate of the vessel 1 and is moved vertically and rotated by rotating means, not shown, through a shaft 2 connected to the turn table 3. On the turn table 3 is disposed a dish-shaped boat 5 which contains a solution 4 to be irradiated and heated by microwaves generated by a microwave generator, not shown, through a wave guide 6 connected to the upper wall of the vessel 1. Vapor and gases generated in the vessel 1 in the heating process are exhausted through a duct 7 to an external exhaust gas treating system. The denitrated product obtained in the boat 5 after the heating process is scratched off and fed into a calcinating vessel, not shown, in which the scratched denitrated product is calcinated at a constant temperature.

Usually, in the denitration process carried out by using a device of the type described above, a temperature of a material to be treated varies with heating time and is represented by FIG. 2.

Referring now to FIG. 2, the temperature of the nitrate solution gradually rises by the continuous irradiation of the microwaves to a time when it reaches about 100°–120° C. which is represented by a point A in FIG. 2. In this time, the concentration is caused by the vaporization of water and nitric acid at 100°–120° C. After the solution has been concentrated to some extent (point B in FIG. 2), the temperature increases and, at 350°–400° C., the denitration reaction proceeds and a denitrated product is finally produced. The denitrated oxide is then calcinated in a calcinating furnace.

However, since the denitration device described hereinbefore is of a batch type, it is difficult to treat a large amount of the solution so that it takes much time to raise or lower the temperature of the calcinating furnace. Moreover, it is troublesome to scratch off and take out the denitrated product and to transfer it into a calcinating furnace located at a different position.

SUMMARY OF THE INVENTION

An object of this invention is to obviate deffects of a conventional batch furnace type denitrated device and to provide an improved denitration system capable of continuously obtaining an oxide product of a starting nitrate salt solution.

Another object of this invention is to provide a denitration system in which evaporation, denitration, and calcinating portions are operatively and continuously connected along the flow direction of a material to be treated.

A further object of this invention is to provide a denitration system in which the material is sufficiently subjected to irradiation of microwaves in the denitration and calcinating portions.

According to this invention, there is provided a system for denitrating a starting nitric acid solution of plutonium nitrate, uranyl nitrate, or mixture thereof by microwave heating thereby to obtain oxide products of the solution, and the system comprises a receiver for receiving the starting solution, an oven vessel having a rectangular configuration and provided with a bottom plate on which the receiver is put, a conveying mechanism located below the bottom plate of the oven vessel for continuously conveying the receiver on the bottom plate throughout the oven vessel, and a heater operatively connected to the oven vessel for generating microwaves to irradiate the content in the receiver when it passes through the oven vessel.

BRIEF DESCRIPTION OF THE DRAWINGS

In the accompanying drawings

FIG. 3 is a schematic representation, partially in a longitudinal section, of a whole system according to this invention;

DESCRIPTION OF THE PREFERRED EMBODIMENTS

Figure 1:
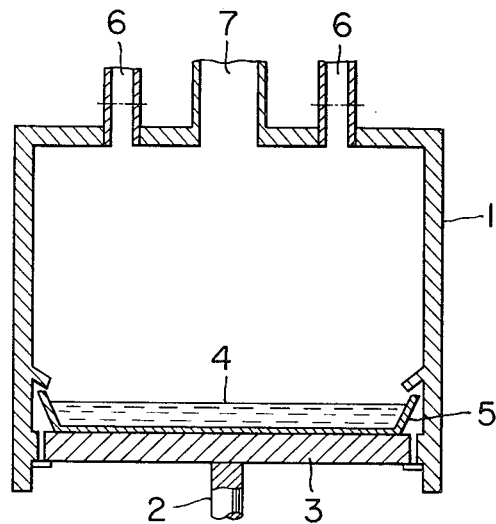
FIG. 1 shows a longitudinal section of a conventional batch furnace type denitration device.
Figure 2:
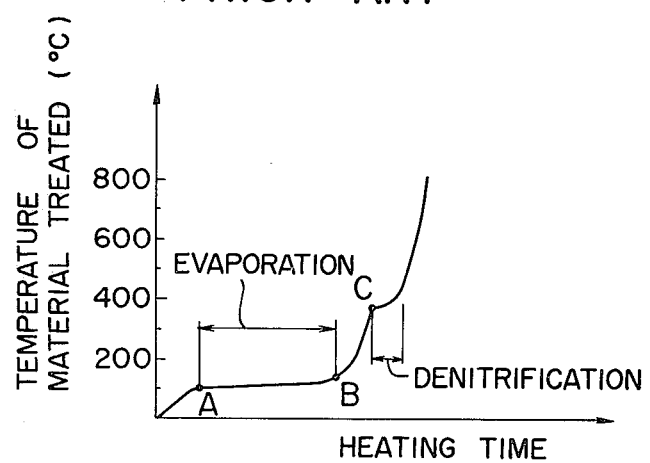
FIG. 2 is a graph showing a temperature curve of a material to be treated by a device, for example, shown in FIG. 1.

Referring to FIG. 3, a denitration system embodying the invention and utilizing microwaves as heating means comprises receiving means for receiving starting solution, oven means in which the solution is heated, evaporated, denitrated and calcinated by irradiating microwaves, conveying means for continuously conveying the receiving means throughout the oven means, and heating means, i.e. microwave generators.

The receiving means comprises a plurality of dish-shaped receiving vessels 5a (hereinbelow, merely called receiver or vessel 5a) and the solution contained therein is heated by irradiating the microwaves during an interval in which they pass through the oven means. A suitable number of receivers 5a can be used depending on the volume of the oven means and the amount of the solutions to be treated.

The oven means generally comprises a rectangular box-shaped vessel 11 provided with an inlet portion 13 and an outlet portion 14 at both end portions of the vessel 11. Trap plates 15 acting as microwave shielding members extend horizontally and outwardly from the main portion 16 of the vessel 11 towards the inlet and outlet portions 13 and 14 to prevent leakage of the microwaves from the vessel 11. The receivers 5a are irradiated by the microwaves in the main portion 16 of the vessel 11 and the main portion is divided into one evaporation chamber 18, one denitration chamber 19, and three calcinating chambers 20 which are separated respectively by partition walls 17 as shown in FIG. 3. To these chambers are connected exhaust conduits 23 and microwave guides 22a, 22b, 22c to which microwave generators 21a, 21b, 21c are connected, respectively. The exhaust conduits 23 are connected to an exhaust gas treating system, not shown. Non-contact type infrared thermometers 24 are connected to the upper walls of the denitration chamber 19 and of the calcinating chambers 20 for detecting temperatures of materials contained in the receivers 5a which pass through these chambers. The provision of the partition plates 17 makes it possible to easily and independently control the temperature of the respective chambers of the oven vessel 11 and the division of the calcinating portion into three chambers 20 makes it possible to heat the respective chambers at different temperatures to attain high heat efficiency in the calcinating process. It is of course possible to increase or decrease the numbers of these chambers as occasion demands.

Figure 4A:
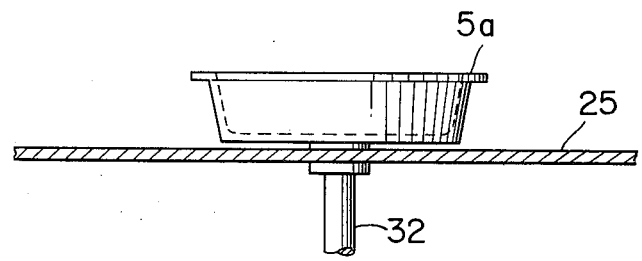
FIG. 4A is a longitudinal sectional view showing the relationship between a material receiver and a bottom plate of the system shown in FIG. 3.
Figure 4B:
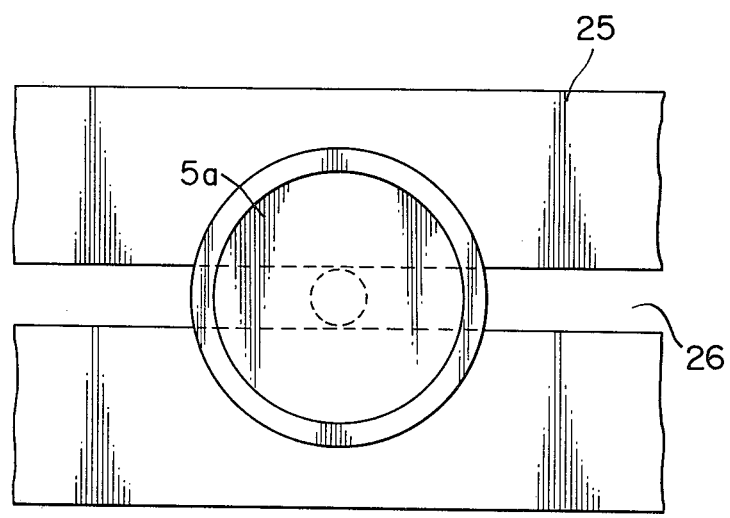
FIG. 4B is a plan view of FIG. 4A.

As shown in FIGS. 4A and 4B, the bottom of the oven vessel 11 comprises a bottom plate 25 which extends horizontally and outwardly over the inlet and outlet portions 13 and 14 and the bottom plate 25 is made of a material suitable for shielding the microwave. The bottom plate 25 is provided with a central slot 26 extending longitudinally throughout the plate 25 and receiver supports 32 attached to the conveying means passing through the slot 26 with the receivers 5a thereon.

A supply device, that is a supply tube 30 in FIG. 3, for supplying the solution to the vessels 5a is located at a portion in front of the inlet portion 13.

Under the bottom plate 25 of the oven vessel 11 is located the conveying means 12 which comprises an endless conveyer 31 running in a direction parallel to the bottom plate 25 and are provided with a plurality of supports 32 which are mounted on the conveyer 31 with a constant spacing to support the receivers 5a, respectively.

Figure 5:
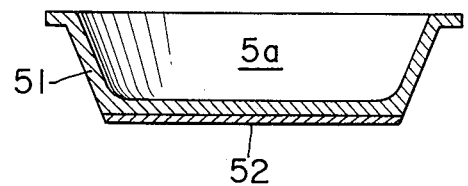
FIG. 5 shows a cross-section of a material receiver.

Although it is desired to construct the main body 51 (FIG. 5) of the receiver 5a with a corrosion proof and heat proof material such as austenite-type stainless steel because the solution is fed into the receiver 5a and treated at a high temperature, the bottom portion 52 (FIG. 5) of the receiver 5a is preferably made of a material such as ferrite-type stainless steel which can be attracted by magnet force. Moreover, it is desired for the receiver 5a to have a circular configuration and no sharp corner portion on its inside for efficiently irradiating the microwaves.

Figure 6:
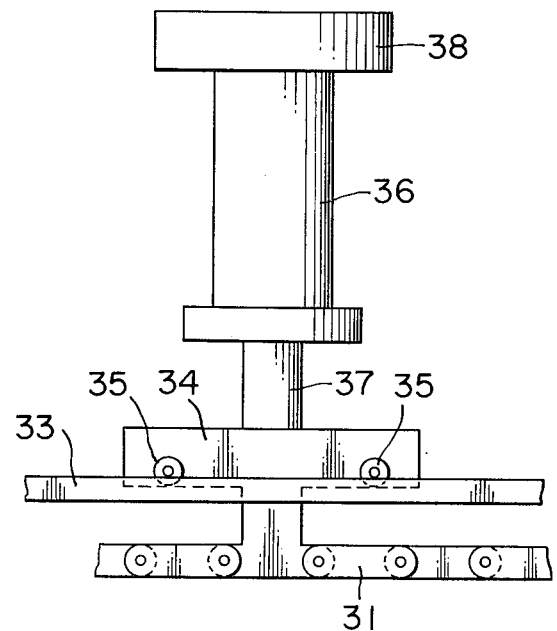
FIG. 6 is a schematic side view of a receiver support.
Figure 7:
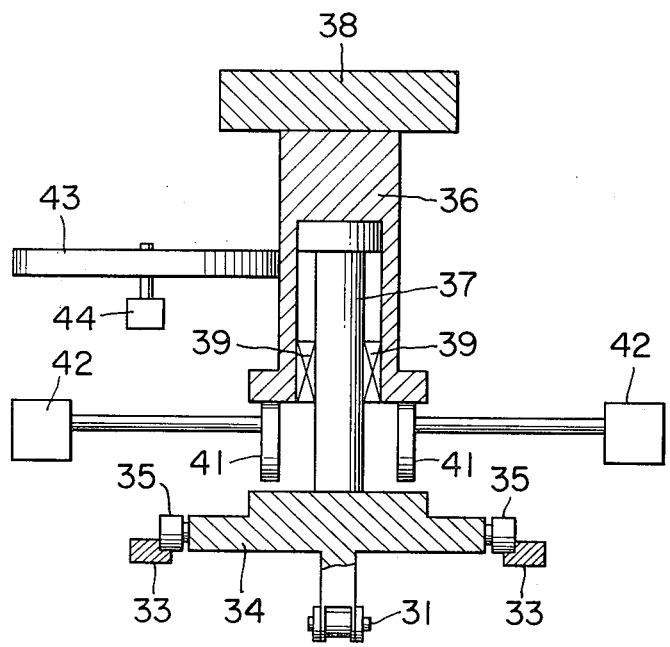
FIG. 7 is a longitudinal sectional view of the support shown in FIG. 6 when it enters into a denitration chamber or calcinating chamber in the system of this invention.

FIG. 6 is a schematic side view of the receiver support 32, and FIG. 7 is a longitudinal sectional view of the support 32 in a case where it is positioned in the denitration chamber 19 and the calcinating chambers 20.

Referring to FIGS. 6 and 7, the support 32 comprises a magnet 38 for attracting and securing the receiver 5a to the support 32 and a shaft 36 for supporting the magnet 38. The shaft 36 is connected rotatably and vertically movably through a bearing 39 to a support rod 37 which is connected to a base member 34, and rollers 35 are attached to the base member 34 on both sides so as to roll on rails 33. Since the base member 34 is secured to the conveyer 31, the rollers 35 roll on the rails 33 when the conveyer 31 is driven.

Figure 8:
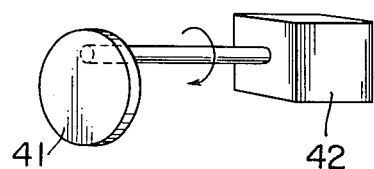
FIG. 8 is a perspective view showing a cam and cam drive mechanism shown in FIG. 7.

When the receiver support 32 on which the receiver 5a is mounted enters into the denitration chamber 19 or the calcinating chamber 20 of the oven vessel 11, the shaft 36 is vertically moved by cams 41 which are in contact with the lower end of the shaft and rotated by cam drive motors 42 as shown in FIG. 7 and FIG. 8. In addition, the shaft 36 is rotated by a rotation member 43 which frictionally engages the shaft and is rotated by a driving motor 44. Thus, the shaft 36, i.e. the receiver 5a on the magnet 38 of the support 32 can be vertically moved and rotated simultaneously when the support 32 enters into the denitration chamber 19 and the calcinating chambers 20.

The system shown in FIG. 3 of this invention operates as follows.

A predetermined amount of nitric acid solution of plutonium nitrate, uranyl nitrate, or mixture thereof is supplied to each receiver vessel 5a through the supply tube 30. The vessels 5a on the magnet 38 are subsequently transferred onto the bottom plate 25 and moved into the oven vessel 11 through the inlet portion 13 in accordance with the movement of the conveyer 31. When the receiver 5a enters into the evaporation chamber 18 of the oven vessel 11, the solution contained in the receiver 5a is irradiated by microwaves generated from the microwave generator 21a through the wave guide 22a and heated to a temperature of about 100°–120° C. thereby to evaporate water content and to produce a nitrate cake. The receiver 5a containing the nitrate cake is then transferred into the denitration chamber 19 in which the nitrate cake is heated to a temperature of about 350°–400° C. by the microwaves generated from the microwave generator 21b through the wave guide 22b so that the nitrate cake will be denitrated and converted into its oxide. During this denitration process, the non-contact type thermometer 24 detects the temperature of the cake, and in accordance with the detected temperature the microwave generator 21b operatively connected to the thermometer 24 is controlled to always maintain a constant temperature. The receiver 5a containing the oxide is then transferred into the calcinating portion 20 in which the oxide is heated and calcinated by the microwaves from the microwave generators 21c through the wave guide 22c. The oxide is completely heated and calcinated during an interval in which it passes through the three calcinating chambers 20. The temperature of the oxide will finally reach about 700°–800° C. which is, although, somewhat different depending upon the materials to be treated. The irradiation of the microwaves from the generators 21c can be controlled by the non-contact type thermometers 24 connected thereto to constantly maintain the temperatures in the respective calcinating chambers 20.

The reason why the receivers are vertically moved and rotated in the denitration chamber 19 and the calcinating chambers 20 is that the solidified materials in the receivers 5a in these chambers are uniformly and completely irradiated by the microwaves, though the solution in the receivers 5a in the evaporation chamber 18 is circulated therein by convection. Although, during this vertical movement and rotation, the receivers 5a also move horizontally in accordance with the movement of the conveyer 31, the upper limit position of the receiver is adjusted so as not to inadvertently contact or collide with the partition plates 17 by suitable means, not shown. Moreover, in another example, it is possible to intermittently stop the movement of the conveyer 31 when the receiver 5a enters into the denitration chamber 19 and the calcinating chambers 20 thereby to vertically move and rotate the receiver as desired.

The product oxide obtained in the final calcinating chamber 20 is transferred out of the oven vessel 11 through the outlet portion 14 and transferred to a next step to be treated.

The exhaust gases and vapors generated in the respective chambers 18, 19, and 20 of the oven vessel 11 are exhausted through the exhaust pipes 23 into an external off-gas treating system, not shown.

According to the system of this invention, in comparison with a conventional batch furnace system, the denitration and calcinating processes are continuously carried out, so that a large amount of oxide with highly uniform quality can be produced at high efficiency. It is not necessary to transfer the content in one receiver to another one when the process changes from one to the other. Moreover, since heating throughout hole processes can be done only be microwaves, the operation of the system can be easily started and stopped in a short time.

What is claimed is:

1. A system for denitrating a starting nitric acid solution of plutonium nitrate, uranyl nitrate, or mixture thereof by microwave heating thereby to obtain oxide products of said solution, comprising means for receiving said starting solution, oven means having a generally rectangular configuration and provided with a bottom plate on which said receiving means is put, conveying means located below said bottom plate of said oven means for continuously conveying said receiving means on said bottom plate throughout said oven means, and heating operatively connected to said oven means for generating microwaves to irradiate the content in said receiving means when it passes through said oven means.

2. The system according to claim 1 wherein said oven means is divided by partition means into an evaporation chamber, a denitrated chamber, and a calcinating chamber and said heating means are provided for all these chambers, respectively, whereby said starting solution is heated, evaporated, denitrated, and calcinated during an interval in which said receiving means is transferred throughout said oven means.

3. The system according to claim 1 wherein said oven means is provided with an inlet portion and an outlet portion at its both ends in the transfer direction of said receiving means, said bottom plate is provided with a slot extending from said inlet portion to said outlet portion, and said conveying means is provided with a plurality of supports each of which fixedly supports corresponding one of said receiving means through said slot during the movement of said receiving means throughout said oven means.

4. The system according to claim 3 wherein said support is provided with a magnet at its upper end which magnetically attracts and securely holds said receiving means.

5. The system according to claim 3 wherein said support is vertically moved by cam means and simultaneously rotated by frictional rotating means when said receiving means located on said support enters into said denitration chamber and said calcinating chamber.

6. The system according to claim 5 wherein said partition means has a lower end which is positioned at a position higher than the upper limit position of said receiving means.

* * * * *